United States Patent Office 3,087,055
Patented Apr. 23, 1963

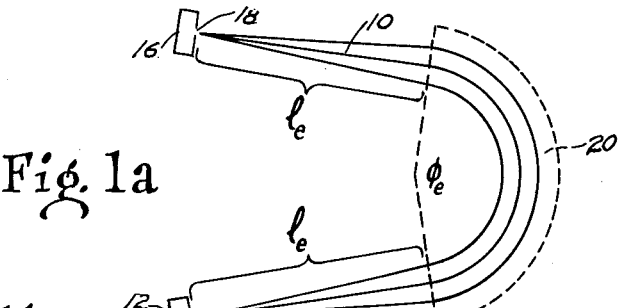
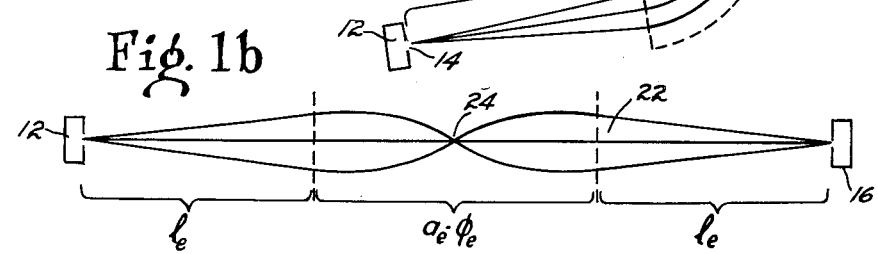
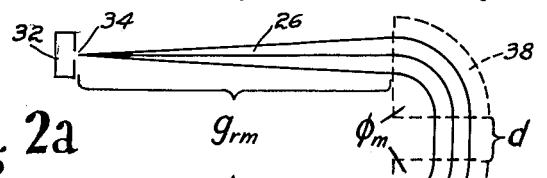
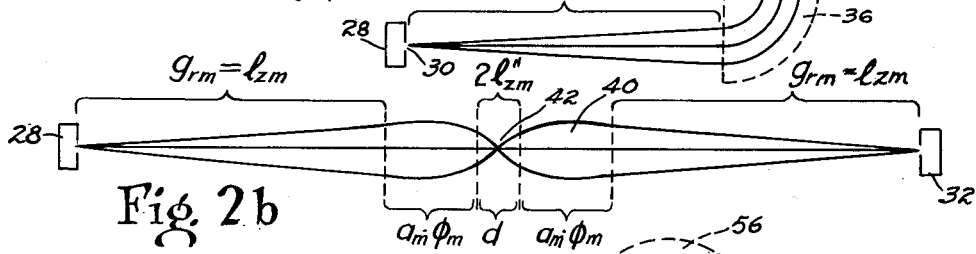
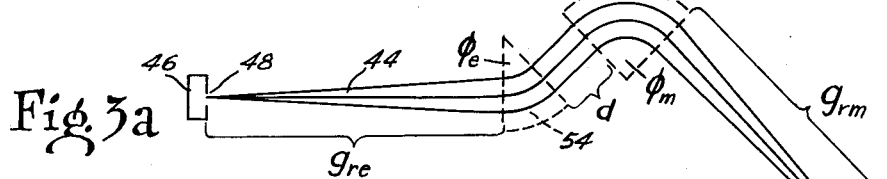
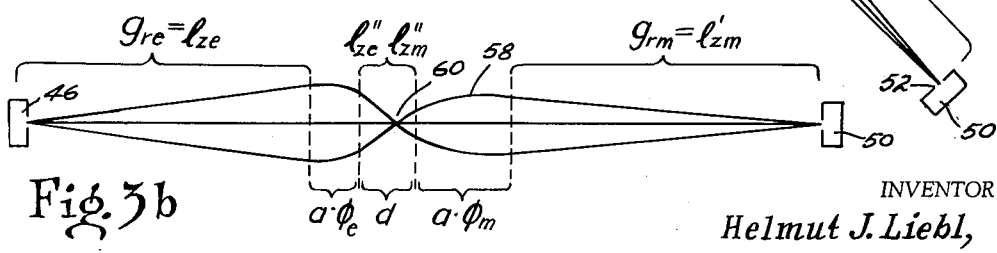

3,087,055
PARTICLE SPECTROMETERS WITH HIGH TRANSMISSION, DISPERSION AND RESOLUTION
Helmut J. Liebl, West Medford, Mass., assignor to Geophysics Corporation of America, Bedford, Mass., a corporation of Delaware
Filed Dec. 9, 1959, Ser. No. 858,501
Claims priority, application Germany Dec. 10, 1958
9 Claims. (Cl. 250—41.9)

The invention concerns a principle of imaging for the purpose of improving transmission, dispersion and resolution of energy spectrometers, momentum spectrometers and mass spectrometers.

In physical, chemical, biochemical and geological research, the electric sector fields of cylindrical, spherical and newly toroidal condensers, too, are used to separate charged particles with regard to their energies; homogeneous or inhomogeneous magnetic sector fields are used to separate charged particles with regard to their momenta; and combinations of such fields are used being mass spectrometers.

Electric sector fields of cylindrical condensers and homogeneous magnetic sector fields have lens properties only in radial direction, i.e., in the direction of the plane determined by the main orbit. Electric toroidal sector fields including the special case of the spherical sector field and magnetic sector fields being inhomogeneous in radial direction have lens properties in the axial direction too, i.e., the direction vertical to the plane determined by the main orbit. The first order lens properties, i.e., focal lengths and focal distances, of a toroidal sector field are determined by the relation $C = a_e/R_e$, $a_e$ being the radial and $R_e$ being the axial mean radius of curvature of the equipotential surface containing the mean orbit. The first order lens properties of a radial inhomogeneous magnetic sector field are determined by the exponent $n$ describing the radial decrease of the field strength:

$$n = -\frac{a_m}{H_{z0}} \cdot \left(\frac{\partial H_z}{\partial r}\right)_0$$

$a_m$ being the mean orbit radius, $H_{z0}$ the field strength along the mean orbit, and $$\left(\frac{\partial H_z}{\partial r}\right)_0$$

the radial change of the axial component of the field strength. There are the following formulas concerning sector fields the boundaries of which are normal to the mean orbit:

TABLE 1

|  | Electrical field | Magnetic field |
|---|---|---|
| Radial focal length | $f_{re} = \dfrac{a_e}{\kappa \sin \kappa \phi_e}$ | $f_{rm} = \dfrac{a_m}{\sigma \sin \sigma \phi_m}$ |
| Radial focal distance | $g_{re} = \dfrac{a_e}{\kappa \tan \kappa \phi_e}$ | $g_{rm} = \dfrac{a_m}{\sigma \tan \sigma \phi_m}$ |
| Axial focal length | $f_{ze} = \dfrac{a_e}{\Gamma c \sin \Gamma c \phi_e}$ | $f_{zm} = \dfrac{a_m}{\Gamma n \sin \Gamma n \phi_m}$ |
| Axial focal distance | $g_{ze} = \dfrac{a_e}{\Gamma c \tan \Gamma c \phi_e}$ | $g_{zm} = \dfrac{a_m}{\Gamma n \tan \Gamma n \phi_m}$ | where $\kappa = \sqrt{2-c}$ and $\sigma = \sqrt{1-n}$
$\phi_e$ = electric field sector angle
$\phi_m$ = magnetic field sector angle From these formulas the following connections are found between radial and axial focusing effects, for different values of $c$ resp. $n$:

TABLE 2

| Electric field | | | Magnetic field | | |
|---|---|---|---|---|---|
| $C=0$ | $\kappa^2 = 2$ | $f_{ze} = \infty$ | $n=0$ | $\sigma^2 = 1$ | $f_{zm} = \infty$ |
| $0<C<1$ | $2>\kappa^2>1$ | $f_{re}<f_{ze}$ | $0<n<\frac{1}{2}$ | $1>\sigma^2>\frac{1}{2}$ | $f_{rm}<f_{zm}$ |
| $C=1$ | $\kappa^2 = 1$ | $f_{re} = f_{ze}$ | $n=\frac{1}{2}$ | $\sigma^2 = \frac{1}{2}$ | $f_{rm} = f_{zm}$ |
| $1<C<2$ | $1>\kappa^2>0$ | $f_{re}>f_{ze}$ | $\frac{1}{2}<n<1$ | $\frac{1}{2}>\sigma^2>0$ | $f_{rm}>f_{zm}$ |
| $C=2$ | $\kappa^2 = 0$ | $f_{re} = \infty$ | $n=1$ | $\sigma^2 = 0$ | $f_{rm} = \infty$ |

For $\kappa^2 = 2$ (cylindrical condenser) resp. $\sigma^2 = 1$ (homogeneous magnetic field) there is no axial focusing; for $2>\kappa^2>1$ resp. $1>\sigma^2>\frac{1}{2}$ radial focusing is stronger than axial one; for $\kappa^2 = 1$ (spherical condenser) resp. $\sigma^2 = \frac{1}{2}$ stigmatic focusing is obtained; for $1>\kappa^2>0$ resp. $\frac{1}{2}>\sigma^2>0$ axial focusing is stronger than radial one; and for $\kappa^2 = 0$ resp. $\sigma^2 = 0$ radial focusing vanishes.

The energy dispersion and resolving power of the electric field is proportional to $2/\kappa^2$. The momentum dispersion and resolving power of the magnetic field is proportional to $1/\sigma^2$. In case of the electric cylindrical field ($\kappa^2 = 2$) resp. the homogeneous magnetic field ($\sigma^2 = 1$) these factors become equal to the unit. For $\kappa^2 = 1$ resp. $\sigma^2 = \frac{1}{2}$ they equal two. In this case one gets an improvement of transmission too, because of stigmatic focusing. If one increases these proportional factors by diminishing $\kappa^2$ resp. $\sigma^2$, the transmission is reduced at once, for according to Table 2 the axial focusing point lies before the radial one, so that the particle bundle has a more or less large axial extension, when it arrives at the point of radial focusing.

The conditions are analogous at a tandem device of an electric and a magnetic field representing a mass spectrometer. In this case, the mass resolving power is proportional to $2/\kappa^2$, and the mass dispersion is proportional to $1/\sigma^2$.

A primary object of the invention is to provide energy, momentum, and mass spectrometers, for which the proportional factors lie within the most advantageous range, i.e., $1>\kappa^2>0$ resp. $\frac{1}{2}>\sigma^2>0$, and which have simultaneously the best transmission because of stigmatic focusing.

Further objects and advantages of the invention will be more apparent upon reference to the following specification, claims and appended drawings wherein:

FIGURES 1a and 1b show the radial and axial focusing paths for an energy spectrometer constructed in accordance with the present invention.

FIGURES 2a and 2b show the radial and axial focusing paths respectively for a momentum spectrometer constructed in accordance with the present invention, and FIGURES 3a and 3b show the radial and axial focusing paths respectively for a mass spectrometer constructed in accordance with the present invention.

According to this invention, this aim can be reached by choosing the focal lengths and geometrical location of the sector fields in such a way that the entrance slit is imaged stigmatically to the collector slit, the bundle of the beams forming more intermediate images of axial focusing than of radial focusing between the entrance slit and the collector slit. The simplest possibility is forming the image with one axial intermediate image but without a radial one.

For this case, three examples are given as follows:

*First Example.—Energy Spectrometer (FIG. 1)*

The general equation of forming an image is:

$$(l'_e - g_e)(l''_e - g_e) = f^2_e \quad (1)$$

where $l'_e$ = object distance
$l''_e$ = image distance
$g_e$ = focal distance
$f_e$ = focal length The image is formed by a single electric sector field located symmetrically between object and image. The latter one should be stigmatic, i.e.

$$l'_{re} = l''_{re} = l'_{ze} = l''_{ze} = l_e$$

and should have an axial intermediate image in the middle of the sector field. One can divide the sector field, the angle of which is $\phi_e$, into two sector fields with the angles $\phi_e/2$. Then the object distance resp. image distance $l_e$ of the whole sector field equals the radial focal distance of half the sector field, and the axial image distance of half the sector field gets zero.

According to Equation 1, the axial imaging equation becomes:

$$\left(\frac{a_e}{\kappa \tan \kappa\phi_e/2} - \frac{a_e}{\sqrt{c} \tan \sqrt{c}\phi_e/2}\right)\left(-\frac{a_e}{\sqrt{c} \tan \sqrt{c}\phi_e/2}\right)$$

$$= \frac{a_e^2}{c \sin^2 \sqrt{c}\phi_e/2}$$

Substituting $c = 2 - \kappa^2$ the following condition equation results:

$$\sqrt{2/\kappa^2 - 1} = -\tan \kappa\phi_e/2 = \tan \sqrt{c}\phi_e/2$$

Assuming $\kappa^2 = \frac{1}{4}$, the following data are obtained:

$$c = \frac{7}{4}; \quad l_e = 2.31a_e; \quad \phi_e = 163.6°$$

FIG. 1 schematically shows the beam orbits of this energy spectrometer: *a*—radial; *b*—axial, straightened out into the drawing plane.

In FIGURE 1a the beam path for the charged particles is generally indicated at 10. The particles emanate from a source 12 and pass through an entrance slit 14, are radially focused through the paths indicated by the solid lines, and pass to a collector 16 including a collector slit 18. Radial and axial focusing are brought about by the electric sector field generated by a suitable lens 20 such as a toroidal condenser.

FIG. 1b shows the axial focusing path of the charged particles in passing from source 12 to collector 16, the path being indicated generally at 22. An intermediate axial image is formed as indicated at 24.

Energy dispersion and resolution is increased four times compared with a spherical condenser having the same mean radius of orbit $a_e$.

*Second Example.—Momentum Spectrometer (FIG. 2)*

An example analogous to the last one in the case of an inhomogeneous magnetic sector field may not be realized as well as in the electrical case, for the sector angle would be larger than 180 degrees. Therefore, a momentum spectrometer consisting of two identical sector fields is given as an example, which images stigmatically and symmetrically with regard to the middle plane between the two sector fields, and which has an axial intermediate image. Then both of the sector fields have the same imaging data if the beam direction in the second sector field is reverse so that the indices ' and " are exchanged.

Assuming $\sigma^2 = \frac{1}{9}$ and $\phi_m = 90°$ results in the following data for the single field, according to Table 1 and Equation 1: $n = \frac{8}{9}$; $l'_{rm} = g_{rm} = l'_{zm} = 5.20a_m$; $l''_{zm} = 0.319a_m$. The distance between both sector fields has to be:

$$d = 2.l''_{zm} = 0.638a_m$$

FIG. 2 schematically shows the beam in this momentum spectrometer: *a*—radial; *b*—axial, straightened out into the drawing plane.

FIGURES 2a and 2b show the radial and axial focusing beam paths at 26 and 40 respectively. Charged particles pass from a source 28 through an entrance slit 30 to a collector 32 including collector slit 34. Heterogeneous fields are generated by the electro optical magnetic lenses indicated by dash lines at 36 and 38. The intermediate axial image is indicated at 42 in FIGURE 2b.

The factor on which momentum dispersion and resolution depends is now increased by the factor: $1/\sigma^2 = 9$.

*Third Example.—Mass Spectrometer (FIG. 3)*

A double focusing stigmatic imaging mass spectrometer is shown in FIGURES 3a and 3b, having an axial intermediate image between the electric and the magnetic sector field, but a parallel beam in the radial direction between both fields for particles of a certain energy. For the purpose of mass separation, a magnetic sector field with the same data as in the last example shall be used: $n = \frac{8}{9}$; $\phi_m = 90°$; $g_{rm} = l'_{zm} = 5.20a_m$; $l''_{zm} = 0.319a_m$. As in the last example, the indices ' and " are changed.

Considering the contrary deflection, the energy focusing condition is $2/\kappa^0.\sin \kappa\phi_e = 1/\sigma.\sin \sigma\phi_m$. Hence follows, if $\kappa^2 = \frac{1}{4}$ as in the first example, $\phi_e = 44.1°$; and also according to Table 1 and Equation 1 the other electric field data: $g_{re} = l'_{ze} = 4.94a_e$; $l''_{ze} = 0.643a_e$. If we assume further $a_e = a_m = a$, the distance between both of the fields becomes $d = l''_{ze} + l''_{zm} = 0.962a_m$.

FIGURES 3a and 3b show the radial and axial beam focusing paths respectively for a mass spectrometer. Ions pass from an ion source 46 through an entrance slit 48, through the radial focusing paths 44 and to a collector 50 having a collector slit 52. The axial focusing path is indicated generally at 58 in FIGURE 3b. A toroidal condenser is indicated by dash lines at 54 and a heterogeneous magnetic field condenser or lens is indicated by dash lines at 56. The cross-over point 60 in FIGURE 3b indicates the intermediate axial focusing image formed by the two lenses.

Such a double focusing mass spectrometer images the entrance slit stigmatically to the collector slit and has an eight times higher resolving power and a nine times higher dispersion than a corresponding one consisting of a cylindrical condenser and a homogeneous magnetic field with the same radii of the mean orbit $a_e = a_m = a$.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spectrometer for electrically charged particles, comprising an entrance opening, means for forming at least one electric sector field, and means for collecting said particles after passing said electric sector field, said forming means providing a sector field having electro-optical properties such that charged particles travelling from the entrance opening to the collecting means are focused both axially and radially and image said entrance opening substantially stigmatically onto said collecting means while forming more axial than radial intermediate images.

2. A spectrometer for electrically charged particles, comprising an entrance opening, means for forming at least one magnetic sector field, and means for collecting charged particles after passing said magnetic sector field, said forming means providing a sector field having electro-optical properties such that charged particles travelling from the entrance opening to the collecting means are focused both axially and radially and image said entrance opening substantially stigmatically onto said collecting means while forming more axial than radial intermediate images.

3. A mass spectrometer, comprising a source of ions, an entrance opening, means for forming at least one electric sector field, means for forming at least one magnetic sector field, and means for collecting said ions after passing said electric and magnetic sector fields, said forming means providing electric and magnetic sector fields having field properties such that ions travelling from said entrance opening to said collecting means are focussed both axially and radially and image said entrance opening substantially stigmatically onto said collecting means while forming more axial than radial intermediate images.

4. A spectrometer for electrically charged particles, comprising an entrance opening, means for forming at least one electric sector field, and means for collecting said particles after passing said electric sector field, said forming means providing a sector field having electro-optical properties such that charged particles travelling from the entrance opening to the collecting means are focussed both axially and radially and image said entrance opening substantially stigmatically onto said collecting means while forming at least one axial intermediate image and no radial intermediate images.

5. A spectrometer for electrically charged particles, comprising an entrance opening, means for forming at least one magnetic sector field, and means for collecting said particles after passing said magnetic sector field, said forming means providing a sector field having electro-optical properties such that charged particles travelling from the entrance opening to the collecting means are focussed both axially and radially and image said entrance opening substantially stigmatically onto said collecting means while forming at least one axial intermediate image and no radial intermediate images.

6. A mass spectrometer, comprising an ion source, an entrance opening, means for forming at least one electric sector field, means for forming at least one magnetic sector field, and means for collecting said ions after passing said electric and magnetic sector fields, said forming means providing electric and magnetic sector fields having field properties such that ions travelling from said entrance opening to the collecting means are focussed both axially and radially and image said entrance opening substantially stigmatically onto said collecting means while forming at least one axial intermediate image and no radial intermediate images.

7. A spectrometer for charged particles, comprising an entrance opening, an electro-optical lens for forming at least one toroidal electric sector field, and means for collecting charged particles after passing said electric sector field, said lens providing a sector field having electro-optical properties such that charged particles travelling from the entrance opening to the collecting means are focussed both axially and radially and image said entrance opening substantially stigmatically onto said collecting means while forming at least one axial intermediate image and no radial intermediate images.

8. A spectrometer for charged particles, comprising an entrance opening, an electro-optical lens for forming at least one heterogeneous magnetic sector field, and means for collecting charged particles after passing said magnetic sector field, said lens providing a sector field having electro-optical properties such that charged particles travelling from the entrance opening to the collecting means are focussed both axially and radially and image said entrance opening substantially stigmatically onto said collecting means while forming at least one axial intermediate image and no radial intermediate images.

9. A mass separator comprising an ion source, an entrance opening, a first electro-optical lens for forming at least one toroidal electric sector field, a second electro-optical lens for forming at least one heterogeneous magnetic sector field, and means for collecting said ions after passing said electric and magnetic sector fields, said lenses in series providing electric and magnetic sector fields having ion optical properties such that ions travelling from said entrance to said collecting means are focussed both axially and radially and image said entrance opening substantially stigmatically onto said collecting means while forming at least one axial intermediate image and no radial intermediate images.

References Cited in the file of this patent

UNITED STATES PATENTS

| | | |
|---|---|---|
| 2,470,745 | Schlesman | May 17, 1949 |
| 2,662,184 | Berry | Dec. 8, 1953 |
| 2,851,608 | Robinson | Sept. 9, 1958 |
| 2,947,868 | Herzog | Aug. 2, 1960 |
| 2,950,388 | White | Aug. 23, 1960 |